Nov. 26, 1957 R. FEITL 2,814,097
APPARATUS FOR APPLYING SPRING RETAINING RINGS
TO SHAFTS, PINS AND THE LIKE
Filed Dec. 31, 1954 2 Sheets-Sheet 1

INVENTOR
RUDOLF FEITL

BY
ATTORNEY

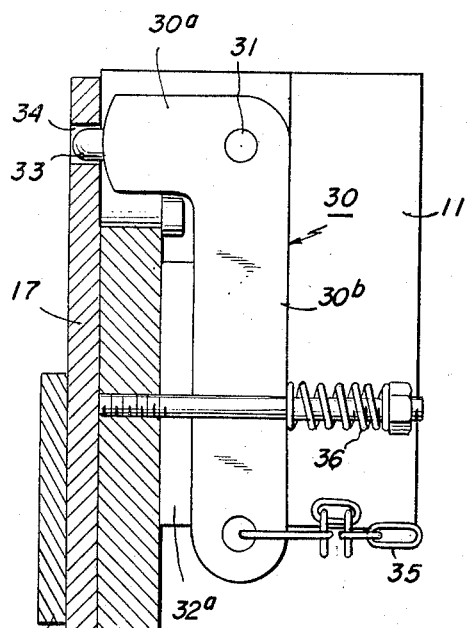
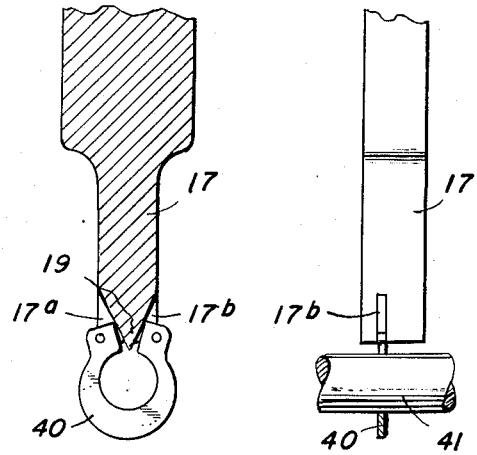
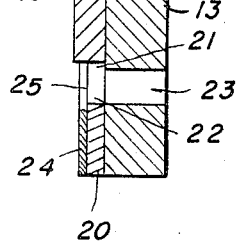
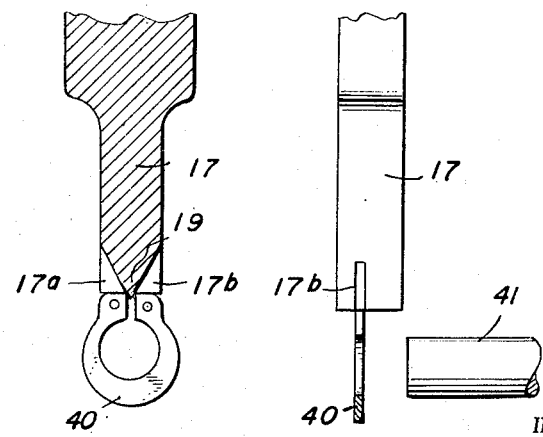

# United States Patent Office 2,814,097
Patented Nov. 26, 1957

2,814,097

APPARATUS FOR APPLYING SPRING RETAINING RINGS TO SHAFTS, PINS AND THE LIKE

Rudolf Feitl, Brooklyn, N. Y., assignor to Waldes Kohinoor, Inc., Long Island City, N. Y., a corporation of New York Application December 31, 1954, Serial No. 479,168

2 Claims. (Cl. 29—229)

This invention relates to improvements in apparatus for applying spring retaining rings to shafts, pins and the like, and more particularly to a bench-type apparatus for mechanizing the assembly of open-ended external retaining rings, and more especially the so-called "grip" rings, on their pins or shafts.

As is well known, open-ended spring rings of the type adapted upon assembly to form an artificial shoulder on a shaft, pin or the like are conventionally provided at their free ends with lugs or ears which are apertured to receive the tips of plier-like tools by which they are manually spread over the end of a shaft and moved therealong to the desired shoulder location. In the case of the ring being designed to seat in a groove provided in the shaft at said location, it may be spread a moderate amount without any danger of its being overspread and thereby taking on a permanent set. However, if the ring is of the so-called "grip" type disclosed and claimed in Heimann U. S. Patent No. 2,574,304, dated November 6, 1952, which secures itself to the smooth peripheral surface of the shaft or pin solely by friction, spreading of the ring must be carefully controlled, since it is inherent in such a ring that spreading thereof must not exceed 5% of the free diameter of the ring. Obviously, such a precise control of ring spreading is difficult if not impossible of attainment by known plier-type tools which are manually operated.

Generally stated, an object of the invention is the provision of a simple, practical apparatus for assembling open retaining rings, particularly of the grip type, on a shaft, pin or the like, without danger of overspreading same.

A more particular object of the invention is the provision of apparatus for mechanizing the assembly of open retaining rings, particularly but not exclusively rings of the grip type whose spreading must be carefully controlled, on their shafts, pins and the like, and which is so constructed and arranged as to provide the requisite close control of ring spreading demanded by such rings.

Another object of the invention is the provision of apparatus as aforesaid characterized in part by mechanical means for spreading a ring, operating in collaboration with means for preventing overspreading of the ring by said spreading means.

A further object of the invention is the provision of apparatus characterized as in the foregoing, and which additionally provides means for mechanically holding the ring during both spreading and the operation of relating it to its shaft or pin, thereby not only eliminating ring overspreading by the operator but also relieving him of the requirement of handling the spread ring in its movement to the desired shoulder location.

Yet another object of the invention is the provision of apparatus for assembling open-ended retaining rings, particularly of the so-called grip type, on pins, shafts and the like, which may be inexpensively manufactured and which is simple, foolproof and thoroughly dependable in operation.

The above and other objects and advantages of the apparatus according to the invention will appear from the following detailed description, reference being had to the accompanying drawings illustrating a specific example thereof, in which Fig. 1 is a broken away, part-sectional plan view of apparatus of the invention;

Fig. 3 is a front-to-rear section taken on line 3—3 of Fig. 1;

Figure 1:
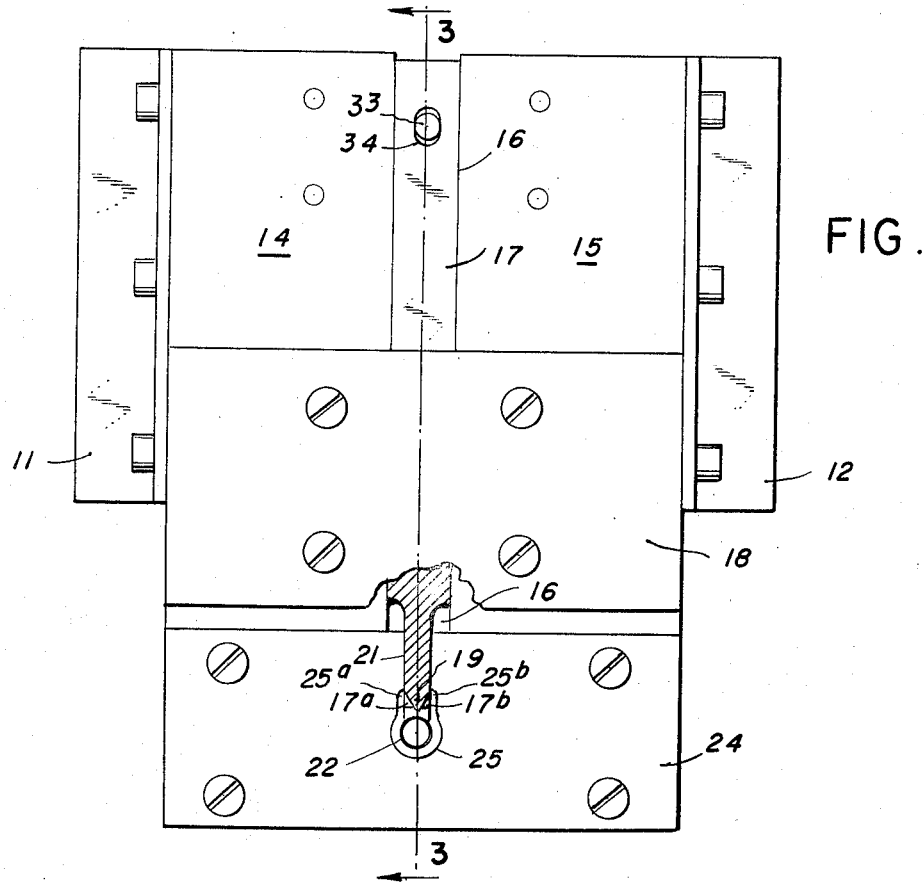

Figs. 4 and 5 are detail views illustrating a grip-type retaining ring in plan, the slide in its retracted and working positions, respectively, and the double-wedge or V-shaping of the working end of the slide; and Figs. 6 and 7 are side views corresponding to Figs. 4 and 5, respectively, which are intended to illustrate the manner of relating a shaft or pin to the spread ring for assembly of the latter thereon.

Referring to the drawings, apparatus according to the invention is adapted to be mounted on a bench 10 or other horizontal support arranged at a convenient working level. Illustratively, it comprises two L-shaped side brackets 11, 12 which are oppositely arranged and which secure between their upper edges a horizontal bed plate 13. Side plates 14, 15 are affixed to the top face of the bed plate, being laterally spaced from one another to define a front-to-rear slideway 16 for a slide 17 of greater length than the depth of the side plates 14, 15, whereby the forward end of the slide projects forwardly beyond said side plates. The aforesaid slideway 16 may be at least partly closed on top by a cover plate 18 secured to the top faces of the side plates so as to extend across same and said channel or slideway.

As seen in Figs. 1, 4 and 5, the forward end of the slide 17 has reduced width, and its front-end corners are cut through by inclined-bottom slots 17a, 17b whose bottoms incline away from one another. Thus, the forward end of the slide has a double-wedge or pointed end portion 19 for the vertical height of said slots, which, for reasons that will become clear hereinafter, is but slightly greater than the axial thickness of the retaining rings to be assembled on their shafts, pins or the like.

Secured to the top face of the bed plate 13 forwardly of the aforesaid side plates 14, 15 is a front under plate 20 (Fig. 3) having cut therein a slot 21 communicating with the slideway 16 and having width corresponding to that of the reduced-width forward portion of the slide 17. The forward end of the slot 21 communicates with an opening 22, also provided in said under plate 20, which opening is disposed above and in registry with an opening 23 provided in the bed plate 13. As will appear hereinafter, the registering openings 22, 23 provide for the insertion of the shaft or pin on which a retaining ring is to be assembled.

Secured flush against and extending substantially coextensive with said front under plate 20 is a front top plate 24 of thickness not substantially greater than the axial thickness of the rings being assembled. Provided in the latter plate is a slot for the reduced-width front end of the slide 17 (corresponding to the aforesaid slot 21) and a communicating opening 25 in registry with the aforesaid openings 22, 23. However, as best seen in Fig. 1, the opening 25 is somewhat larger than the opening 22, so that the edge zone of the latter provides a ledge or shoulder for a retaining ring placed in the opening 25. Said opening 25 is also shaped complementally to the outer-edge contour of an open retaining ring turned so that its end lugs directly face the slide 17; that is to say, while generally circular throughout, it has recesses 25a, 25b which are the reverse of the apertured end lugs of the retaining ring. Moreover, according to the invention, said opening 25 is formed slightly oversize with respect to the outer edge contour of the ring, with the excess being such as to limit spreading of a ring contained in the opening 22 to a predetermined maximum amount, which, in the case of the grip ring, is 5% of the free diameter thereof.

At this point of the description, it is noted that the level of the aforesaid slots 17a, 17b of the slide 17 corresponds to that of the front top plate 24, whereby the double-wedge or pointed end portion 19 of the slide is horizontally aligned with and thus may enter the gap between the open ends of a retaining ring placed in the recess 25, as illustrated in Figs. 4 and 5.

Figure 2:
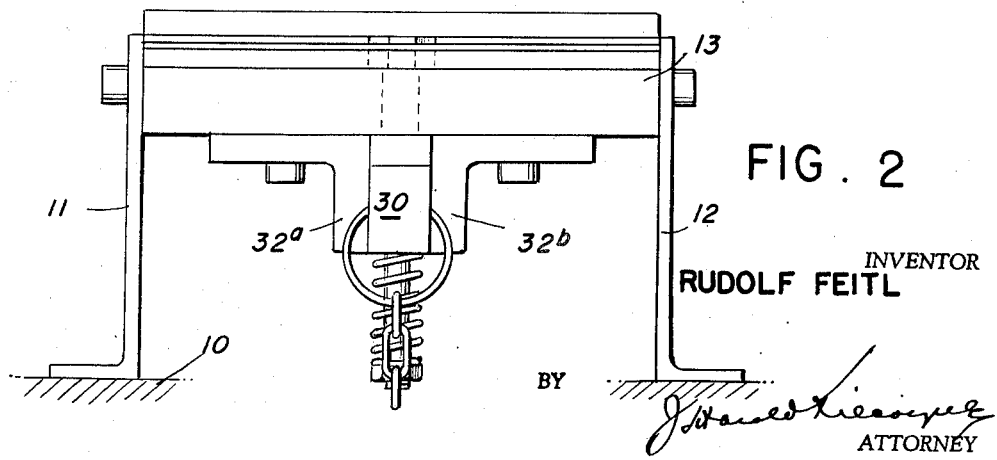
Fig. 2 is a plan view thereof.

The slide 17 may be reciprocated in the slideway 16 by suitable means illustratively comprising (Fig. 3) a bell crank lever 30 disposed intermediate, and fulcrumed to turn on a cross pivot 31 extending between, angle brackets 32a, 32b (Fig. 2) secured to the under face of the bed plate 13. One arm 30a of said lever extends upwardly through a suitable slot provided therefor in the bed plate and terminates in a stud 33 received in an opening 34 in the rear end of the slide 17. To the other arm 30b of the lever is connected a chain (or cable) 35 extending downwardly to a foot-pedal (not shown). Thus, depression of the pedal results in counter-clockwise rotation of the bell-crank lever 30 and forward motion of the slide 17. Return movement of the slide is effected as by a spring 36 upwardly reactive against the lever and urging same in clockwise direction.

To apply a retaining ring such as is designated 40 (Figs. 4 and 5) on its shaft 41, the operator simply drops a ring into the ring pocket provided by the opening 25 of the front plate 24 and the ledge or shoulder extending about the opening 23 of the under plate 20, wherein the ring is of necessity properly oriented, and it is also supported from below by said ledge or shoulder. The operator then proceeds to step on the pedal, such resulting in forward movement of the slide 17. Consequent thereto, its double-wedge or pointed front end portion 19 enters the gap of the ring and spreads same. At this point, it is explained that the angle of the wedge or point 19 and the stroke of the slide are preferably so chosen that the ring will not overspread. But if overspreading is likely, such is positively prevented by the recess 25, which limits ring spreading to the maximum permissible amount, as the latter is determined by the clearance or excess of the opening 25 with respect to external edge contour of the ring. The operator may now insert the shaft or pin 41 through the aligned openings 22, 23, 25 and the enlarged ring opening from beneath the ring by an amount as to bring the shaft in desired assembly location with respect to the ring. Finally, the operator removes his foot from the pedal, whereupon the slide 17 retracts and the ring contracts on the shaft or pin.

Without further analysis, it will be seen that apparatus as described above achieves the objectives therefor stated in the foregoing in simple, effective and thoroughly dependable manner. It will also be understood that apparatus according to the invention is not limited to the assembly of but one size of grip-type retaining ring on a shaft or pin of fixed diameter. Rather, by providing front top plates 24 according to ring size, and by the interchange of said plates as needed, the apparatus is capable of handling a large range of ring sizes. The openings 22, 23 are or may be made substantially oversize, thus also to handle a large range of shaft or pin sizes. While apparatus of the invention was designed primarily for facilitating the assembly of and at the same time for preventing the overspreading of the so-called grip-type retaining ring, it is equally applicable to the assembly of open spring retaining rings of the type that are designed for assembly in the groove of a shaft, pin and the like.

As many changes could be made in carrying out the above constructions without departing from the scope of the invention, it is intended that all matter contained in the above description or shown in the accompanying drawings shall be interpreted as illustrative and not in a limiting sense.

I claim:

1. Apparatus for applying open-ended spring retaining rings having a gap between their open ends to shafts and the like comprising, in combination, means having a ring pocket defined by a bottom wall providing a seat for a retaining ring to be assembled and a side wall which in plan is shaped complementally to the outer edge contour of such a ring when the latter is spread a maximum permissible amount not exceeding 5% of its free diameter, said bottom wall having an opening for entry of the shaft on which the ring is to be assembled, said pocket side wall having a side opening with which the gap of a ring seated in said pocket is adapted to align, said means also having a slideway external of the pocket and communicating with the pocket interior through said side opening, a slide mounted in the slideway for reciprocatory movement and having a wedge-shaped end portion adapted on the working stroke of the slide to move through said side opening and to operatively contact the gap-defining ends of the seated ring thereby to spread said ring the maximum permissible amount as determined by the ring outer-edge abutting the pocket side wall, and means operatively related to said pocket and slideway means for reciprocating said slide from and to a normally retracted position.

2. Apparatus as set forth in claim 1, wherein said pocket and slideway means include a bed plate providing a horizontal mounting and working surface, rearwardly disposed side plates affixed to the top face of the bed plate and being spaced apart to provide a slideway on said top face, and upper and under plates also affixed to said top face and disposed forwardly of said saide plates, said upper and under plates being provided with registering slots extending in continuation of said slideway and terminating in coaxial openings which define said ring pocket, said bed plate being provided with an opening disposed immediately below said coaxial openings and which provides said shaft-entry opening.

References Cited in the file of this patent

UNITED STATES PATENTS

| | | |
|---|---|---|
| 1,571,916 | Grubman | Feb. 2, 1926 |
| 1,571,917 | Grubman | Feb. 2, 1926 |
| 1,764,146 | Bramberry | June 17, 1930 |
| 1,923,199 | Hackney | Aug. 22, 1933 |
| 2,317,122 | Volpin | Apr. 20, 1943 |
| 2,532,141 | Barkan et al. | Nov. 28, 1950 |
| 2,652,128 | Sawdy | July 24, 1951 |